United States Patent
Qi et al.

(10) Patent No.: US 7,206,290 B2
(45) Date of Patent: Apr. 17, 2007

(54) METHOD AND APPARATUS FOR ESTIMATING SPEED-ADAPTED CHANNEL

(75) Inventors: Gang Qi, Shen Zhen (CN); Yu Jin, Shen Zhen (CN)

(73) Assignee: Huawei Technologies Co., Ltd., Shen Zhen (CN)

( * ) Notice: Subject to any disclaimer, the term of this patent is extended or adjusted under 35 U.S.C. 154(b) by 1047 days.

(21) Appl. No.: 10/316,703

(22) Filed: Dec. 10, 2002

(65) Prior Publication Data

US 2003/0198285 A1    Oct. 23, 2003

Related U.S. Application Data

(63) Continuation of application No. PCT/CN01/00690, filed on May 8, 2001.

(30) Foreign Application Priority Data

Jun. 15, 2000    (CN)    ................................. 00 1 16539

(51) Int. Cl.
*H04J 1/16*    (2006.01)
(52) U.S. Cl. ...................................... 370/252; 375/148
(58) Field of Classification Search ................ 370/252, 370/329, 437, 478; 455/425; 375/147, 148, 375/233
See application file for complete search history.

(56) References Cited

U.S. PATENT DOCUMENTS

6,240,099 B1    5/2001    Lim et al.
6,289,217 B1 *   9/2001    Hamalainen et al. ........ 455/425

FOREIGN PATENT DOCUMENTS

| EP | 0 762 703 A1 | 3/1997 |
| EP | 0 912 019 A2 | 10/1998 |
| WO | WO 96/42146 | 12/1996 |

* cited by examiner

*Primary Examiner*—John Pezzlo
(74) *Attorney, Agent, or Firm*—Dorsey & Whitney LLP

(57) ABSTRACT

A method and apparatus is provided for estimating a speed-adapted channel. The method is operative to use a known transmit symbol of guide frequency field in each slot to derive a corresponding fading value of the guide frequency field in the estimation to decide feedback channel by linear interpolation at first; and accumulate and average them for eliminating noise and performing interpolation process for the channel fading value in an outgoing data field; then according to the moving speed of a mobile station, adjust the length of the channel fading of the guide frequency which takes part in the accumulation to adapt to influence caused by different channel fading. It realizes the objectives of making more subscribers to get better and necessary services and making use of the system's resource effectively and reasonably.

4 Claims, 2 Drawing Sheets

METHOD AND APPARATUS FOR ESTIMATING SPEED-ADAPTED CHANNEL

CROSS-REFERENCE TO RELATED APPLICATION

This utility patent application is a continuation of International Patent Application, serial number PCT/CN01/00690, filed on May 8, 2001, which claims the priority of the Chinese patent application, serial number CN 00116539.9, filed on Jun. 15, 2000; subject matter of which are incorporated herewith by reference.

FIELD OF THE INVENTION

The invention relates to receiver's demodulation part of a CDMA (Code Division Multiple Access) system, and more particularly to a method and apparatus for estimating a speed-adapted channel for signals which are received from a fading channel, wherein the fading channel is subject to changes in different communication speed or rate due to an up channel configuration in a WCDMA (Wide-band Code Division Multiple Access) and CDMA2000 system.

BACKGROUND OF THE INVENTION

With explosively increasing of services in the communication industry, the requirement for communication capacity, flexibility and quality continuously increases. Technology develops from analog to digital, from FDMA (Frequency Division Multiple Access) to TDMA (Time Division Multiple Access) and to existing CDMA. Compared with a generally used TDMA system, CDMA has some special advantages, such as higher efficiency of frequency use, larger communication capacity, better security, better service and lower cost. Therefore, DS-CDMA (Direct Sequence Code Division Multiple Access) system gradually becomes a necessary selection to meet the requirement of rapid increasing communication in a third generation of mobile communication system. The main difference between DS-CDMA and TDMA or FDMA systems is that in a DS-CDMA system, all subscribers use the same frequency bandwidth, and different subscribers are distinguished by a uniquely assigned PN code sequence. The invention is suitable for an application using a protocol standard of the third generation of mobile communication based on DS-CDMA technology.

It is noted that rapid channel fading is an outstanding problem in digital mobile communication. In a process of signal transmission, a transmission channel is severely affected by fading caused by selection of time and frequency. It is necessary to develop advanced and reliable channel detection and estimation technology to perform accurate estimation to balance or correct channel distortion, so as to reliably recover or restore a transmit signal at a receiver. Also, advanced and reliable channel detection and estimation technology can alleviate the limitation of performance of the other parts in a communication system to a great extent, thereby developing a system with larger capacity, smaller size and lower cost. For example, a base station with excellent receiver performance allows a mobile station to use a smaller transmit power so as to reduce battery consumption at the mobile station, and to reduce signal interference with the other subscribers simultaneously, thus improving the quality of signal link.

According to the existing protocol standard, in a dedicated up channel for a WCDMA and CDMA2000 system, a commonly used data structure is that a control channel DPCCH (Digital Processing Control Channel) and a service channel DPDCH (Digital Processing Data Channel) transmit in parallel through orthogonally scrambled coding. The DPCCH channel is operative to have an intermittent pilot (or guiding frequency) format (see FIG. 1) with a TDMA address in a slot including a pilot sign and a control message, and with BPSK (Binary Phase-Shifted Keying) modulated data.

For a transmit signal with the above data structure, a demodulation technique plays an important role in how to correctly and effectively recover or restore the original transmit signal at a receive terminal. A more effective correlation demodulation is that a received signal is multiplied by a detected reference signal to remove the effect of a fading channel in radio transmission, such as the deviation of phase and/or magnitude of a transmit signal. The reference signal is an estimation value of a signal that experiences the channel fading. Generally, link capacity is inversely proportional to SNR (Signal-to-Noise Ratio) of a receive signal receiver that needs to reach certain performance. For a signal experiencing channel fading, a correlation detection is a suitable detection scheme for a CDMA system because a correlation detection requires less SNR than an uncorrelation detection. Thus, accurate estimation of magnitude and phase of a fading channel is needed under a condition of multi-path channel with rapid channel fading. A lot of methods have been proposed including simple usage of a pilot message in a pilot field to interpolate a channel fading value of an outgoing data field; adapted forward prediction by using a data field and a pilot field simultaneously; or a lattice filter by using forward and backward predictions to estimate a channel and so on. These methods can obtain good results under a certain environment. However, in addition to satisfying the requirement of large data traffic transmission, a lot of data services of the third generation of mobile communication system must be suited for a large range of moving speed change, for example, from still to 500 km/h. It is difficult for the existing channel estimation methods to meet the requirement of communication quality for a system in various conditions.

SUMMARY OF THE INVENTION

In view of the deficiency of the existing channel estimation methods, one of the objectives of the invention is to provide a method and apparatus for estimating speed-adapted channel to overcome the problem of channel estimation with an intermittent pilot format under the fast channel fading condition, and thus obtaining a preferred performance of channel estimation within the range of moving speed change to meet the third generation of mobile communication needs.

In order to achieve the objective, the invention provides a method for estimating speed-adapted channel comprising the steps of:

deriving a corresponding channel fading value of a guide frequency field having a plurality of slots by using a transmit symbol in each slot of the guide frequency field, in an estimation to decide a feedback channel by linear interpolation;

accumulating and averaging the channel fading values to eliminate noise;

performing interpolation for the channel fading values in an outgoing data field; and adjusting a length of the channel fading values of the guide frequency field which takes part in the accumulating step, according to a moving speed of a mobile station, to adapt to effects caused by different length of channel fading.

The method for estimating the speed-adapted channel further comprises the steps of:

a) multiplying a corresponding receive signal by a transmit guide frequency symbol, after performing the step of deriving the channel fading values with noise each symbol experienced in a pilot field and after accumulating and averaging step to eliminate the noise, and treating the multiplied values as the channel fading values of the guide frequency field in a current slot to interpolate into the channel fading values of the guide frequency field in a next slot to obtain an outgoing channel modulation value for a data symbol field in the current slot, wherein the channel fading values of the current slot are initial estimation of corresponding channel message of the data symbol field in each slot;

b) deriving the outgoing-channel modulation value for the data symbol field in each path, performing a RAKE combination on the outgoing-channel modulation values to determine a temporary channel estimation value for restoring a transmit data symbol;

c) multiplying a data field of a receive signal from each path by the estimation value corresponding to the transmit data symbol to obtain more accurate channel estimation value of the data field, combining with a delayed outgoing-channel modulation value of the guide frequency field, that is the channel fading value of the guide frequency field derived from the step (a), to build up a data sequence of a quasi-continuous guide frequency;

d) passing the channel estimation value derived from the step (c) through a low pass filter of length $2D_{f+1}$ to further suppress noise in the channel estimation value; and e) sending the channel estimation value derived from the step (d) and a delayed receive signal to a Viterbi soft decoder for decoding.

The length parameter of channel fading that is used to eliminate noise and the order parameter of the low pass filter can be obtained from a speed estimation value provided by an estimation apparatus for receiver speed by calculation with predetermined corresponding relation or look-up table, wherein the faster the speed of a mobile station, the smaller the values of the length parameter of channel fading and the order parameter of the low pass filter.

An apparatus for estimating a speed-adapted channel comprises a demultiplexer, a first multiplier, an adding unit, a temporary decision unit, a multiplexer, a first conjugation unit, and a second multiplier in successive connection. The apparatus further comprises a low pass filter, a second conjugation unit, a third multiplier, a Viterbi soft decoder, an interpolation section, a delay unit, an estimation unit for a channel fading rate, and a look-up table, wherein the low pass filter, the second conjugation unit, the third multiplier and the Viterbi soft decoder are successively connected, an output from the second multiplier is connected respectively to the low pass filter and the estimation unit for the channel fading rate, an output from the estimation unit for the channel fading rate is connected to the interpolation section through the look-up table, a second output from the demultiplexer is connected to the interpolation section, an output from the interpolation section is connected to the first multiplier, an output from look-up table is connected respectively to the low pass filter and the delay unit, inputs of the delay unit and the demultiplexer are connected in parallel, and an output from the delay unit is connected to the Viterbi soft decoder through the third multiplier.

DETAILED DESCRIPTION OF THE PREFERRED EMBODIMENTS

Figure 1:
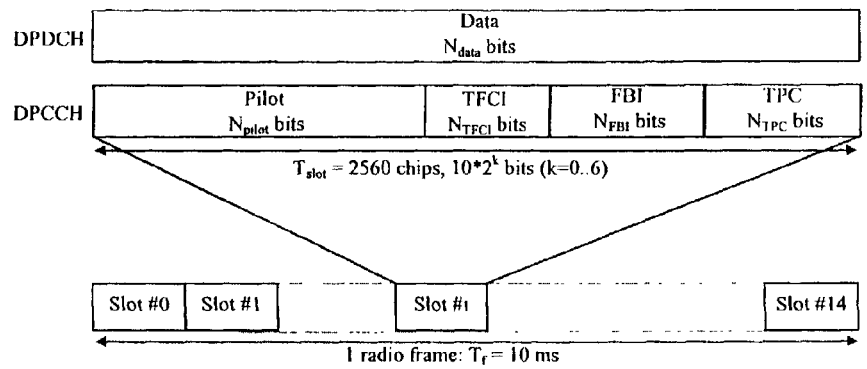
FIG. 1 is a schematic diagram of one embodiment of a slot structure for a WCDMA up transmission channel.

In following description, assuming that a single subscriber system transmits a signal modulated by a Binary Phase-Shifted Keying (BPSK) or a Quaternary Phase-Shifted Keying (QPSK). An intermittent guide frequency format is used in slots of a channel. Each slot length is $T_{slot}=(N_p+N_d)T$, where T is a time period of a single symbol, $N_d$ is a length of data symbol, $N_p$ is a length of guide frequency symbol. For example, a time slot structure of an up control channel DPCCH for a WCDMA system is shown in FIG. 1.

If a multi-path channel includes L propagation paths which can be separated (l=0, 1, . . . ,L−1), then a received signal can be expressed as follows:

$$r(kT) = \sum_{l=0}^{L-1} c_l(kT)s(kT - \tau_l) + n_l(kT) \quad (1)$$

where $n_l(t)$ is background noise, which can be regarded as additive Gauss white noise, its density of one side power spectrum is $N_0$; $c_l(t)$ and $\tau_l$ is a complex channel gain and delay in the l-th path; s(t) is corresponding transmit basic band signal.

For the DPCCH channel using the intermittent guide frequency format, after a receive signal passes a coherent Rake receiver, the receive signal is resolved into L QPSK signals with a different time delay. A m-th data output from a matched filter at the n-th time slot is expressed as:

$$\hat{d}(m, n) = \sum_{l=0}^{L-1} r_l(m, n)\hat{c}_l(m, n), \quad m = N_p, N_{p+1}, \cdots N_p + N_d - 1 \quad (2)$$

An existing method to decide a feedback by adapted prediction is fundamentally to use a LMS filter to a predict channel fading value:

$$c_k \approx yk / xk \underline{\Delta} \tilde{c}_k, \quad (3)$$

$$\hat{c}_k = \sum_{i=1}^{N} b_i^* \tilde{c}_{k-i} \underline{\Delta} \vec{b}(k)^H \vec{\tilde{c}}(k),$$

$$\vec{\tilde{c}}(k) = (\tilde{c}_{k-1}, \tilde{c}_{k-2}, \ldots, \tilde{c}_{k-N})^T, \quad \vec{b}(k) = (b_1, b_2, \ldots b_N)^T$$

where $y_k$ is the k-th receive signal and is equivalent to r(kT) in equation (1). $c_k$ is a real channel fading value, $\tilde{c}_k$ is a corrected estimation value of channel fading, which is obtained by comparing the receive signal $y_k$ with a detection symbol $\bar{x}_k$ which results from a hard decision and by BPSK modulating the receive signal again. $\hat{c}_k$ is a predicted value of channel fading at the k-th time point, passing the LMS filter with coefficient $\vec{b}(k)=(b_1,b_2,\ldots,_N)^T$. The filter coefficient is derived by descending recursion:

$$\vec{b}(k+1)=\vec{b}(k)+\mu(\tilde{c}_k-\hat{c}_k)^* \tilde{c}(k) \tag{4}$$

where $\mu$ is a step length of the LMS filter.

After derivation of $\hat{\xi}_k$ data symbol, $$\hat{x}_k = \frac{y_k}{\hat{c}_k}$$

can be estimated and is modulated to corresponding $\bar{x}_k$ by minimum distance decision criterion:

$$\bar{x}_k = \min_{x_k \in D} |\hat{x}_k - x_k|, \quad D = \{+1, -1\} \tag{5}$$

In the guide frequency field at each slot, guide frequency symbol $x_k$ is known, a channel value obtained from the symbol is more accurate and can be used to train existing coefficient $\vec{b}(k)$ of the LMS filter.

One of the advantages of an adapted prediction method is no delay, though the operation of the LMS filter is very complicated, and operation load increases acutely with increasing of the filter order. In addition, selection of step length $\mu$ of the LMS filter is a key point to influence on final performance. If adapted adjustment is used, the operation load is heavier. On the contrary, the interpolation method is simpler with a light operation load.

In the existing methods, a known transmit data of a guide frequency field in a slot is used to derive a message of fading channel of the guide frequency field firstly, then a channel fading value in a data field is estimated by interpolation. As a guide frequency signal is known before, a gain of l-th path at a guide frequency symbol al(m,n),m=0,1, ... $N_p$–1 can be estimated too. The change during $N_p$ intervals of the guide frequency symbol can be negligible. After demodulation average thereof, we can get:

$$\hat{c}_l(n) = \frac{1}{N_p} \sum_{m=0}^{N_p-1} r_l(m, n)\exp\{-jk\pi\} \tag{6}$$

In equation (6), k value is decided by a pattern corresponding to the m-th guide frequency. If it is 1, 1 is taken; if it is 0, 0 is taken.

The main work of interpolation method is to use known $\hat{c}_l(n)$ to interpolate $\hat{c}_l(m,n),m=N_p,N_p+1,\ldots N_p+N_d-1$ corresponding to the data symbol, thus remov effects or influence on a channel through correlation in demodulation.

A simple and realizable channel estimation method by interpolation is the Gaussian interpolation as introduced below.

A Gaussian interpolation filter (or "Gauss filter") pertains to the field of low pass filter. The selection of coefficients of a Gauss filter is different for its different order. Generally, there are zero order, first order and second order. The first order Gaussian interpolation requires the data of the guide frequency field in a slot to be derived and a next slot after it, and the second order Gaussian interpolation requires the data of the guide frequency field in a slot to be derived and slots followed to and by it, respectively. Their corresponding interpolation equation is:

$$\hat{c}_l(m,n) = Q_{-1}\left(\frac{m'}{N}\right)\hat{c}_l(n-1) + Q_0\left(\frac{m'}{N}\right)\hat{c}_l(n) + Q_1\left(\frac{m'}{N}\right)\hat{c}_l(n+1); \tag{7}$$

where $N=N_d+1$, $m'=m-N_p+1=1,2 \ldots N_d$

Their respective weighted coefficients are as follows,

For the first order:

$$Q_{-1}\left(\frac{m}{N}\right) = 0 \tag{8}$$

$$Q_0\left(\frac{m}{N}\right) = 1 - \left(\frac{m}{N}\right)$$

$$Q_1\left(\frac{m}{N}\right) = \frac{m}{N}$$

It can be seen that the first order Gaussian interpolation is equivalent to linear interpolation.

For the second order:

$$Q_{-1}\left(\frac{m}{N}\right) = \frac{1}{2}\left\{\left(\frac{m}{N}\right)^2 - \frac{m}{N}\right\} \tag{9}$$

$$Q_0\left(\frac{m}{N}\right) = 1 - \left(\frac{m}{N}\right)^2$$

$$Q_1\left(\frac{m}{N}\right) = \frac{1}{2}\left\{\left(\frac{m}{N}\right)^2 + \frac{m}{N}\right\}$$

In order to suppress Gaussian noise in a channel, $\tilde{c}_k$ is not directly input, but let it pass a low pass filter with length $2D_f+1$ for improvement of SNR and accuracy of channel estimation when the result of the channel estimation and a delayed receive data are sent to a Viterbi soft decoder and corresponding channel DPDCH interpolation section.

$$\bar{c}_{k-D_f} = \sum_{i=0}^{2D_f} h_i \tilde{c}_{k-i} \tag{10}$$

As the guide frequency symbol in a slot structure of a WCDMA up-line or up-channel DPCCH is longer, a great change of channel fading suffered by the first and last guide frequency symbols in a slot occurs because of the fast moving speed when interpolation is used to estimate a channel. At that time, it is no longer suitable to average all estimation values of channel of the guide frequency field in a slot.

In order to solve this problem, the invention divides the channel fading value of the guide frequency field into two parts with length $N_p',N_p'<N_p$, respectively, then they are averaged:

$$\hat{c}_{l,f}(n) = \frac{1}{N_{p'}} \sum_{m=0}^{N_{p'}-1} r_l(m, n) \exp[-jk\pi] \quad (11)$$

$$\hat{c}_{l,b}(n) = \frac{1}{N_{p'}} \sum_{m=N_p-N_{p'}}^{N_p-1} r_l(m, n) \exp[-jk\pi]$$

When interpolation carries for a data filed in the n-th slot, the operation is performed by using $N_{p'}$ symbols after the number n slot pilot filed to obtain a channel fading value $\tilde{c}_{l,f}(n)$, using $N_{p'}$ symbols before the number (n+1) slot pilot field to obtain a channel fading value $\tilde{c}_{l,b}(n+1)$, which are to be regarded, respectively, as $\tilde{c}_l(n)$ and $\tilde{c}_l(n+1)$ in equation (7), if the first order Gaussian interpolation is used.

Figures 2, 3:
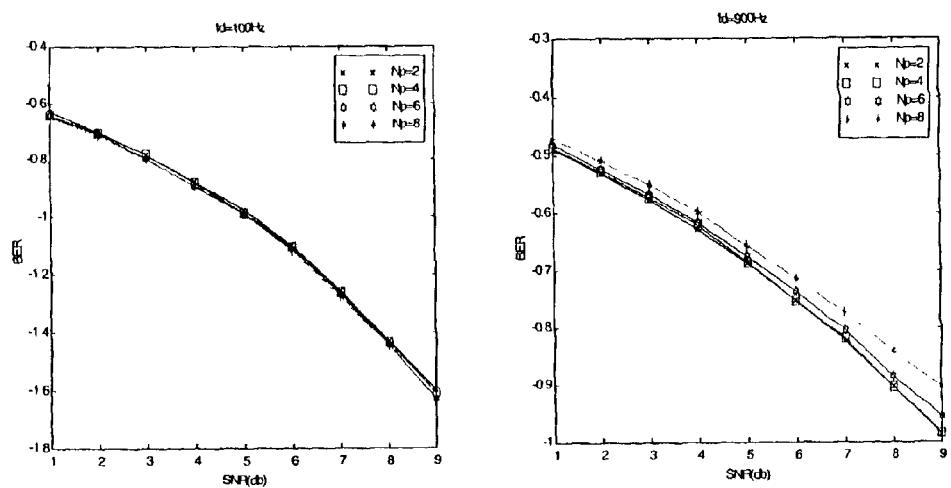
FIG. 2 is a change curve of error rate versus $N_pC$ at SNR=2 dB, Doppler frequency fd=100 Hz under a vehicular environment.
FIG. 3 is a change curve of error rate versus $N_pC$ at SNR=2 dB, Doppler frequency fd=900 Hz under a vehicular environment.

FIG. 2 and FIG. 3 illustrate DPDCH error rate curves obtained by taking different $N_{p'}$ values under different Doppler frequencies. DPCCH has 6 pilot symbols of each slot.

It can be seen from the result that a longer length of $N_{p'}$ can be taken when SNR is low and channel fading speed is slow. At the time set $N_{p'}=N_p$, it is unnecessary to calculate $\tilde{c}_l(n)$ and $\tilde{c}_l(n+1)$ respectively. On the contrary, the fast channel fading performance decreases if $N_{p'}$ takes a full length of the guide frequency in one slot instead of taking that in two slots. Thus, the selection of $N_{p'}$ affects the final estimation of channel performance in some extent. In order to solve the problem, the invention uses the result provided by a speed estimation apparatus in front end speed to determine the length of $N_{p'}$. It approximately estimates Doppler frequency $\hat{f}_e$ of a current channel fading change before noise elimination for the estimation value of channel fading is performed by a filter, and according to the result, it uses a look-up table to determine an average length of a channel value of the guide frequency field before interpolation. By this way, a real-time adjustment can be completed according to moving speed of the mobile station.

In addition, the selection of a low pass filter's order in equation (10) also has great influence on final performance of channel estimation. Therefore, the invention also uses estimated '$f_e$ to adjust an order parameter $D_f$ for the filter, if $D_f$ is predetermined, an approximate result is obtained through change of value $\{h_i, i=0, 1, \ldots 2D_f\}$ Speed estimation is completed by measuring the statistical characteristics of a receive signal, such as a horizontal passing rate of a receive envelope, or by using covariance, spectrum estimation, or small wave transformation, as desired.

The invention is directed to a structure of an up channel in the third generation mobile communication WCDMA and CDMA 2000 system. The estimation method includes using a look-up table or calculation equation of corresponding parameters according to speed estimation of a mobile station, meanwhile adjusting an averaged length of a channel fading value of the guide frequency field before interpolation and a smooth length of quasi-continuous guide frequency resulted after a decision of feedback. By this way, a lower operation load can be used to complete the process of accurate channel estimation of the up channel in a WCDMA and CDMA2000 system, and a better result of communication quality is obtained under the condition of communication of different moving speeds.

The estimation method is operative to use a known transmit symbol of a guide frequency field in each slot to derive a corresponding fading value of the guide frequency field in the estimation to decide feedback channel by a linear interpolation at first; and accumulate and average them for eliminating noise and performing interpolation process for a channel fading value in an outgoing data field; then according to the moving speed of a mobile station, adjust the length of the channel fading of the guide frequency which takes part in the accumulation to adapt to influence caused by different channel fading. The estimation method further comprises the steps of:

(a) multiplying a corresponding receive signal by a transmit guide frequency symbol, after performing the step of deriving the channel fading values with noise each symbol experienced in a pilot field and after accumulating and averaging step to eliminate the noise, and treating the multiplied values as the channel fading values of the guide frequency field in a current slot to interpolate into the channel fading values of the guide frequency field in a next slot to obtain an outgoing channel modulation value for a data symbol field in the current slot, wherein the channel fading values of the current slot are initial estimation of corresponding channel message of the data symbol field in each slot;

b) deriving the outgoing-channel modulation value for the data symbol field in each path, performing a RAKE combination on the outgoing-channel modulation values to determine a temporary channel estimation value for restoring a transmit data symbol;

c) multiplying a data field of a receive signal from each path by the estimation value corresponding to the transmit data symbol to obtain more accurate channel estimation value of the data field, combining with a delayed outgoing-channel modulation value of the guide frequency field, that is the channel fading value of the guide frequency field derived from the step (a), to build up a data sequence of a quasi-continuous guide frequency;

d) passing the channel estimation value derived from the step (c) through a low pass filter of length $2D_{f+1}$ to further suppress noise in the channel estimation value; and (e) sending the channel estimation value derived from the step (d) and a delayed receive signal to a Viterbi soft decoder for decoding.

The length parameter of channel fading that is used to eliminate noise and the order parameter of the low pass filter can be obtained from a speed estimation value provided by an estimation apparatus for receiver speed by calculation with predetermined corresponding relation or look-up table, wherein the faster the speed of a mobile station, the smaller the values of the length parameter of channel fading and the order parameter of the low pass filter.

Figure 4:
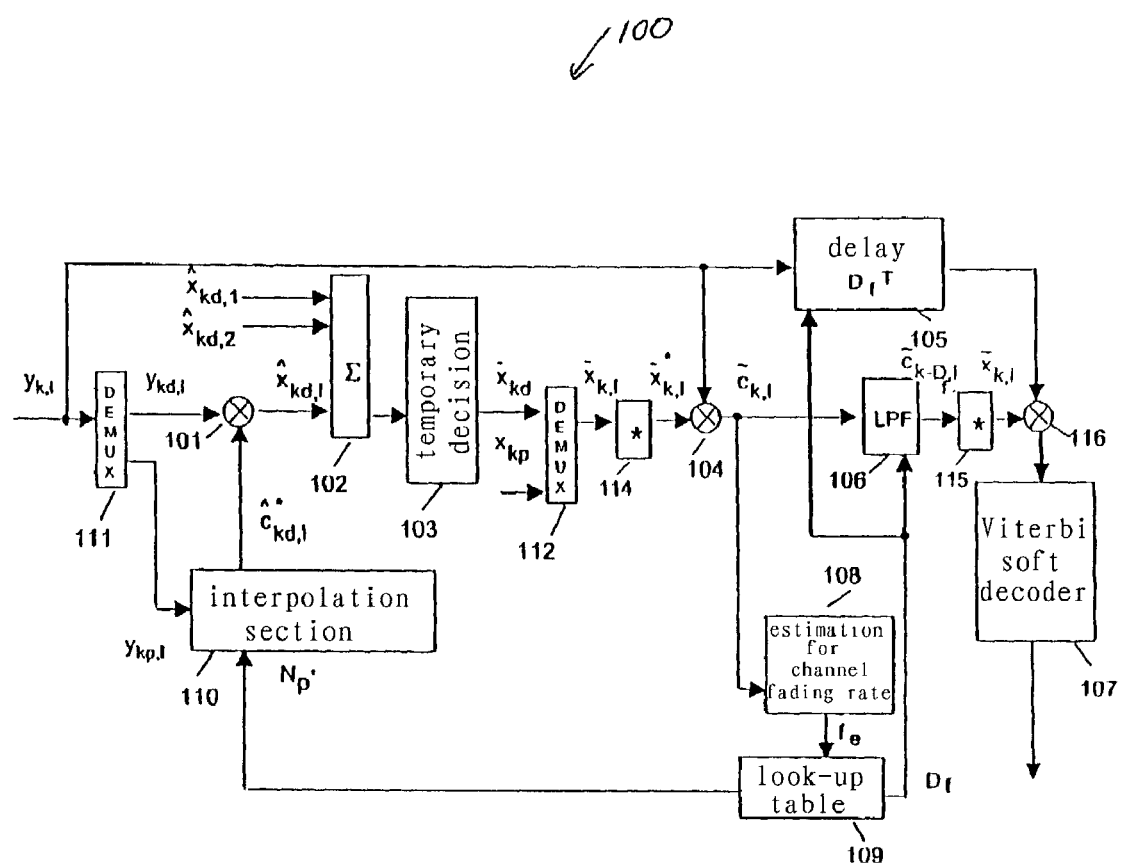
FIG. 4 is a schematic diagram of an apparatus for estimating a speed-adapted channel in accordance with the principles of the present invention.

Now, referring to FIG. 4, one embodiment of an estimation apparatus 100 in accordance of the principles of the present invention includes a demultiplexer 111, a first multiplier 101, an adding unit 102, a temporary decision unit 103, a multiplexer 112, a first conjugation unit 114, and a second multiplier 104 in successive connection. The apparatus 100 also includes a low pas filter 106, a second conjugation unit 115, a third multiplier 116, a Viberbi soft decoder 107, an interpolation section 110, a delay unit 105, an estimation unit for channel fading rate 108, a look-up table 109. The low pass filter 106, the second conjugation unit 115, the third multiplier 116, and the Viterbi soft decoder 107 are successively connected. An output from the second multiplier 104 is connected respectively to the low pass filter 106 and the estimation unit for channel fading rate 108. An output from the estimation unit for channel fading rate 108 is connected to the interpolation section 110 through the look-up table 109. Another output from the demultiplexer 111 is connected to the interpolation section 110. An output from the interpolation section 110 is connected to the first multiplier 101. An output from the look-up table 110 is respectively connected to the low pass filter 106 and the delay unit 105, while an input to the delay unit 105 and the demultiplexer 111 are connected in parallel. An output from the delay unit 105 is connected to the Viterbi soft decoder 107 through the third multiplier 116.

At time point k, a DPCCH signal on the l-th path received by a receiver (the k-th symbol of a receive signal on the l-th path) passes the demultiplexer 111 and is divided into two parts: a receive data in the guide frequency field and a receive data of the data field. Receive data of the guide frequency field $y_{kp,l}$ (the k-th symbol of the guide frequency data on the l-th demultiplexer output) is sent to the first order Gaussian interpolation module 110. By operation of the equations (11), (7), (8), the k-th channel value $\hat{c}_{kd,1}$ on l-th path of a data field is provided, and after its conjugation operation, multiplied with the receive data of the data field $y_{kd,1}$ by the first multiplier 101 to obtain the k-th data symbol estimation value $\hat{x}_{kd,1}$ for the l-th path and pass to the adding unit 102 together with the corresponding estimation values $\hat{x}_{kd,1}$, $\hat{x}_{kd,2}$ on the other path to complete the RAKE combination to get combined value $\hat{x}_k$. Then, the value $\hat{x}_k$ is operative to pass the temporary decision unit 103 and outputs an estimation value $\hat{x}_{k,d}$ of BPSK modulation of transmit data symbol. This result and the known transmit symbol $x_{k,p}$ in the guide frequency field are combined by the multiplexer 112 to restore the original structure of the slot $\hat{x}_{k,l}$, which is conjugated by the first conjugation unit 114 and multiplied with the l-th path's receive signal at time point k through the second multiplier 104 to obtain a more accurate estimation value $\tilde{c}_{k,l}$ for a channel at time point k. $\tilde{c}_{k,l}$ is sent to the low pass filter 106 to select the length of filtering with equation (10) and get a delayed and Gaussian noise suppressed estimation channel value $\bar{c}_{k-D_f,l}$ to take a conjugation by the second conjugation unit 115. The result from unit 115 is multiplied by the l-th path's receive signal $y_{k-D_f,l}$, which passes $D_f$ symbol delay unit 105 through the third multiplier 116. Its output functions as an input of the Viterbi soft decoder 107.

At the same time, $\tilde{c}_{k,l}$ is also used as an input to the estimation unit for channel fading rate 108. By statistics of the frequency of rotary angle change within unit time for $\tilde{c}_{k,l}$ other speed estimation method, an approximate estimation value $\hat{f}_e$ of a present channel fading rate is obtained. In the look-up table 109, the channel fading rate and corresponding proper averaged length of a channel value of the guide frequency field are stored in advance. With input $\hat{f}_e$, an accumulated de-noise length $N_p$, suitably applied to the present period and the order parameter of the low pass filter $D_f$ are obtained. They are used to adjust the Gaussian interpolator section 110, the low pass filter 106, and the delay unit 105, respectively.

INDUSTRIAL APPLICATION

As the invention adopts the above technical scheme, more subscribers gain better necessary service under a limited system's resource, such as fixed numbers of channels, total transmit power, and limited operation ability of all control units in the system. The system needs accurate location of the mobile station and speed message to complete the distribution of channels for the mobile station and distribution of reasonable cells for handover and access. For example for a mobile station in a slow speed moving, an adjacent micro cell is distributed for the mobile station, whereas for a fast speed moving, a macro cell is distributed for the mobile station so as to avoid frequent control operations for handover and access, and to achieve highly effective and reasonable application of the system's resource.

In addition, it is possible to provide more services besides voice and data in next generation of mobile communication. These auxiliary control systems also use accurate mobile station location and speed message. The parameters are obtained by a related estimation apparatus in the system, such as an estimation apparatus of location and speed for a mobile station. It can be seen that these messages are very helpful in obtaining accurate channel estimation.

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

What is claimed is:

1. A method for estimating a speed-adapted channel, comprising the steps of:
    deriving a corresponding channel fading value of a guide frequency field having a plurality of slots by using a transmit symbol in each slot of the guide frequency field, in an estimation to decide a feedback channel by linear interpolation;
    accumulating and averaging the channel fading values to eliminate noise;
    performing interpolation for the channel fading values in an outgoing data field; and
    adjusting a length of the channel fading values of the guide frequency field which takes part in the accumulating step, according to a moving speed of a mobile station, to adapt to effects caused by different length of channel fading.

2. The method for estimating the speed-adapted channel of claim 1, further comprising the steps of:
    a) multiplying a corresponding receive signal by a transmit guide frequency symbol, after performing the step of deriving the channel fading values with noise each symbol experienced in a pilot field and after accumulating and averaging step to eliminate the noise, and treating the multiplied values as the channel fading values of the guide frequency field in a current slot to interpolate into the channel fading values of the guide frequency field in a next slot to obtain an outgoing channel modulation value for a data symbol field in the current slot, wherein the channel fading values of the current slot are initial estimation of corresponding channel message of the data symbol field in each slot;
    b) deriving the outgoing-channel modulation value for the data symbol field in each path, performing a RAKE combination on the outgoing-channel modulation values to determine a temporary channel estimation value for restoring a transmit data symbol;
    c) multiplying a data field of a receive signal from each path by the estimation value corresponding to the transmit data symbol to obtain more accurate channel estimation value of the data field, combining with a delayed outgoing-channel modulation value of the guide frequency field, that is the channel fading value of the guide frequency field derived from the step (a), to build up a data sequence of a quasi-continuous guide frequency;

d) passing the channel estimation value derived from the step (c) through a low pass filter of length $2D_{f+1}$ to further suppress noise in the channel estimation value; and (e) sending the channel estimation value derived from the step (d) and a delayed receive signal to a Viterbi soft decoder for decoding.

3. The method for estimating the speed-adapted channel of claim 2, wherein a length parameter of channel fading that is used to eliminate noise and an order parameter of the low pass filter are obtained from a speed estimation value provided by an estimation apparatus for receiver speed by calculation with a predetermined corresponding relation or a look-up table, wherein the faster a speed of a mobile station, the smaller values of the length parameter of channel fading and the order parameter of the low pass filter.

4. An apparatus for estimating a speed-adapted channel, comprising:

a demultiplexer, a first multiplier, an adding unit, a temporary decision unit, a multiplexer, a first conjugation unit, and a second multiplier being in successive connection;

a low pass filter, a second conjugation unit, a third multiplier, a Viterbi soft decoder, an interpolation section, a delay unit, an estimation unit for a channel fading rate, and a look-up table being in successively connection;

an output from the second multiplier being connected respectively to the low pass filter and the estimation unit for the channel fading rate;

an output from the estimation unit for the channel fading rate being connected to the interpolation section through the look-up table;

a second output from the demultiplexer being connected to the interpolation section;

an output from the interpolation section being connected to the first multiplier;

an output from look-up table being connected respectively to the low pass filter and the delay unit;

inputs of the delay unit and the demultiplexer being connected in parallel; and an output from the delay unit being connected to the Viterbi soft decoder through the third multiplier.

* * * * *